June 14, 1938. K. D. JOHNSON 2,120,863
FISHING HOOK
Filed April 20, 1936
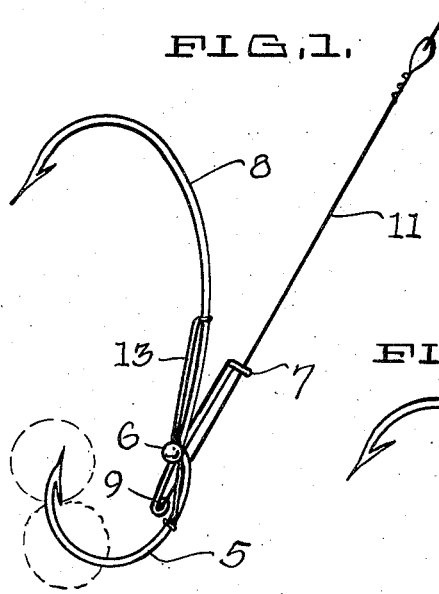
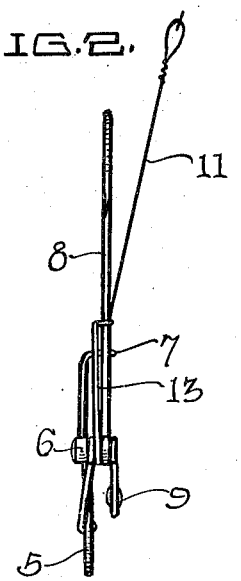
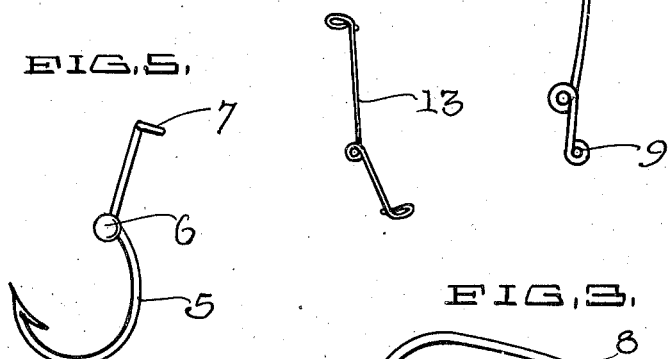
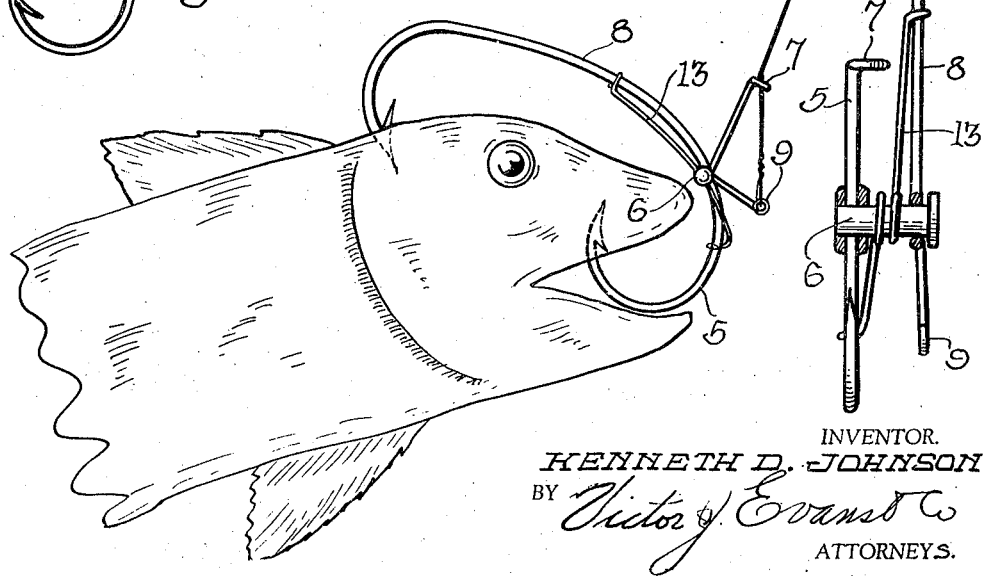
INVENTOR.
KENNETH D. JOHNSON
BY
ATTORNEYS.

Patented June 14, 1938

2,120,863

UNITED STATES PATENT OFFICE 2,120,863

FISHING HOOK

Kenneth D. Johnson, Pasadena, Calif.

Application April 20, 1936, Serial No. 75,448

1 Claim. (Cl. 43—37)

This invention relates to improvements in fish hooks and has particular reference to a fish hook wherein the fish will be securely held against withdrawal of the hook through any maneuvers of the fish.

A further object is to produce a device of this character which may be baited in the usual manner, cast in the usual manner, and one which will automatically engage the fish with a second barb as soon as a slight pull occurs upon the line.

A further object is to produce a hook which is economical to manufacture.

Other objects and advantages will be apparent during the course of the following description.

In the accompanying drawing forming a part of this specification and in which like numerals are employed to designate like parts throughout the same, Fig. 1 is a side elevation of my hook in opened position;

Fig. 2 is a front elevation of Fig. 1;

Fig. 3 is a side elevation showing the hook as the same would engage a fish;

Fig. 4 is a side elevation of the auxiliary hook;

Fig. 5 is a side elevation of the main hook;

Fig. 6 is a side elevation of the spring; and

Fig. 7 is an enlarged detailed view of the manner in which the two hooks are pivoted together.

It is a well known fact that many fish, particularly the larger ones, are able to expel the hook from the mouth by a series of quick jerky movements, particularly if the fish is that variety having what is known as "a tender mouth."

Therefore, I have devised a hook which, when pulled upon to a small degree by the fish in taking the bite, will actuate an auxiliary hook which will engage the fish at another point outside of the mouth, thus giving a double-hook action and also resulting in a more deep embedment of the hooks as the fish pulls or jerks to free himself therefrom.

In the accompanying drawing wherein for the purpose of illustration is shown a preferred embodiment of my invention, the numeral 5 designates the main hook having a pivot 6 and an eye 7. Mounted upon the pivot 6 is an auxiliary hook 8 having an eye 9 to which the leader 11 is attached. This leader is in turn connected to the line in any desired manner, and passes through the eye 7. A spring 13 has its opposite ends engaging the hooks 5 and 8 and has its central portion wound around the pivot 6. This spring, therefore, normally maintains the two hooks in the position shown in Fig. 1. However, after the fish engages the hook, as indicated in Fig. 3, a pull thereon moves the two hooks into position of this figure against the tension of the spring 13.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

A fish hook of the character described comprising a main hook having a barb at one end and an eye at the opposite end, said main hook having a pivot extending transversely therefrom and positioned between said barbed end and said eye end, an auxiliary hook rotatably mounted on said pivot, said auxiliary hook including a barb at one end and an eye at the opposite end to which a leader is attached, said leader extending through the eye on the main hook, and a spring mounted on said pivot and engaging each of said hooks whereby said barbed ends are normally maintained away from each other.

KENNETH D. JOHNSON.